United States Patent
Blick et al.

(10) Patent No.: US 8,416,026 B2
(45) Date of Patent: Apr. 9, 2013

(54) NANOSCALE ELECTROMAGNETIC RADIATION DEVICE USING SERPENTINE CONDUCTOR

(75) Inventors: Robert H. Blick, Madison, WI (US); Max G. Lagally, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 130 days.

(21) Appl. No.: 13/028,892

(22) Filed: Feb. 16, 2011

(65) Prior Publication Data
US 2012/0119837 A1    May 17, 2012

Related U.S. Application Data

(60) Provisional application No. 61/309,176, filed on Mar. 1, 2010.

(51) Int. Cl.
*H03B 5/326* (2006.01)

(52) U.S. Cl. .... 331/107 A; 385/28; 250/310; 250/493.1; 257/14; 372/2

(58) Field of Classification Search ............... 385/28; 331/107 A; 250/310, 493.1; 257/14; 372/2
See application file for complete search history.

(56) References Cited

U.S. PATENT DOCUMENTS

| 7,083,104 B1 * | 8/2006 | Empedocles et al. ......... 235/491 |
| 7,279,901 B2 | 10/2007 | Diehl et al. |
| 2009/0032842 A1 | 2/2009 | Lagally et al. |

OTHER PUBLICATIONS

Huang, M., et al., Mechano-electronic Superlattices in Silicon Nanoribbons, pp. 721-727, vol. 3, No. 3, 2009, ACS Nano, ACS Publications, Washmgton, DC, USA.

* cited by examiner

*Primary Examiner* — Arnold Kinkead
(74) *Attorney, Agent, or Firm* — Boyle Fredrickson, S.C.

(57) ABSTRACT

A nanoscale serpentine ribbon is used to produce electromagnetic radiation by accelerating charge carriers as constrained along a serpentine path defined by the ribbon so that curve portions of the ribbon promote acceleration-induced emission of electromagnetic radiation by the charge carriers.

15 Claims, 2 Drawing Sheets

NANOSCALE ELECTROMAGNETIC RADIATION DEVICE USING SERPENTINE CONDUCTOR

CROSS REFERENCE TO RELATED APPLICATION

This application claims the benefit of U.S. Provisional Application 61/309,176 filed Mar. 1, 2010 hereby incorporated by reference.

STATEMENT REGARDING FEDERALLY SPONSORED RESEARCH OR DEVELOPMENT

This invention was made with government support under N66001-07-1-2046 awarded by the NAVY/ONR and FA9550-08-1-0337 awarded by the USAF/AFOSR. The government has certain rights in the invention.

BACKGROUND OF THE INVENTION

The present invention relates to a device for generating electromagnetic radiation by accelerating charges on a small serpentine conductor.

Electromagnetic radiation may be generated by the acceleration (deceleration) of the charged particles such as electrons. This radiation may be Bremsstrahlung radiation, for example, of the type occurring when electrons are rapidly decelerated when striking a target, or as synchrotron radiation occurring when the trajectory of high-speed electrons is curved, for example, as the electrons pass through a magnetic field.

This latter principle is used in a "free-electron laser" (FEL) where a transversely aligned magnetic array, often termed a "wiggler", produces a perturbation in the path of relativistic electrons. A similar effect may be seen in a "Bloch oscillator" where the perturbation of the electrons is caused by the periodic lattice potential of a crystal rather than a magnetic wiggler.

SUMMARY OF THE INVENTION

The present invention generates electromagnetic radiation by channeling charge carriers along a serpentine path through a nanoscale conductive ribbon. The small dimensions of the ribbon constrain the charge carriers tightly in a series of small radius curves that can produce electromagnetic radiation in the microwave region and potentially at light frequencies. The addition of appropriate resonant-cavity structures may permit stimulated emissions or similar behavior to provide coherent, laser-like radiation from a small device. Tuning of the radiation frequencies may be obtained by physically altering the dimensions of the structure (e.g., changing the period of the serpentine path) or changing the electrical potential driving the charge carriers along the path.

Specifically, the present invention provides an electronic device having a substrate providing a first and second electrical terminal holding between them a ribbon of conductive material defining a serpentine electrical path. The ribbon provides a thickness along its narrowest dimension of less than 1000 nm and has periodic curved portions exposed to emit electromagnetic radiation in excess of one MHz caused by an acceleration of charge carriers in the curve portions as the charge carriers pass along the ribbon between the first and second terminals.

It is thus a feature of at least one embodiment of the invention to provide a novel small-scale electromagnetic radiation source.

The ribbon may be a semiconductor material having a different lattice constant than that of the substrate to be pre-strained compressively when fabricated on the substrate, then to buckle into a serpentine configuration providing the periodic curve portions when subsequently released from the substrate yet constrained between the terminals.

It is thus a feature of at least one embodiment of the invention to provide a self-assembling structure for this device.

The ribbon may be a silicon-germanium alloy and the substrate is substantially a silicon substrate.

It is thus a feature of at least one embodiment of the invention to provide a device using available integrated-circuit materials and techniques.

The device may further include an actuator attached to the substrate to change a length of the substrate measured between the first and second electrical terminal to change a period of the periodic curve portions and hence the frequency of the emitted radiation.

It is thus a feature of at least one embodiment of the invention to provide a tunable electromagnetic radiation source.

The actuator may be a piezoelectric material bonded to the substrate and activated by electrical voltage to change the length of the substrate.

It is thus a feature of at least one embodiment of the invention to provide a robust actuator that can be readily integrated into a small-scale device.

Alternatively, the ribbon may be graphene and the electromagnetic radiation may be in excess of one GHz or one THz.

It is thus a feature of at least one embodiment of the invention to provide a similar structure with the potential to emit light frequencies.

The device may further include an adjustable voltage source connected between the first and second terminal to apply different accelerating forces to the charge carriers in the curve portions passing along the ribbon between the first and second terminals.

It is thus a feature of at least one embodiment of the invention to provide an alternative or additional tuning mechanism to mechanical tuning.

The device may further include a resonant cavity receiving emitted electromagnetic radiation and returning it to the ribbon structure to promote coherent emission of electromagnetic radiation.

It is thus a feature of at least one embodiment of the invention to provide a novel high frequency emitter, laser, or maser device.

These particular objects and advantages may apply to only some embodiments falling within the claims and thus do not define the scope of the invention.

DETAILED DESCRIPTION OF THE PREFERRED EMBODIMENT

Figure 1:
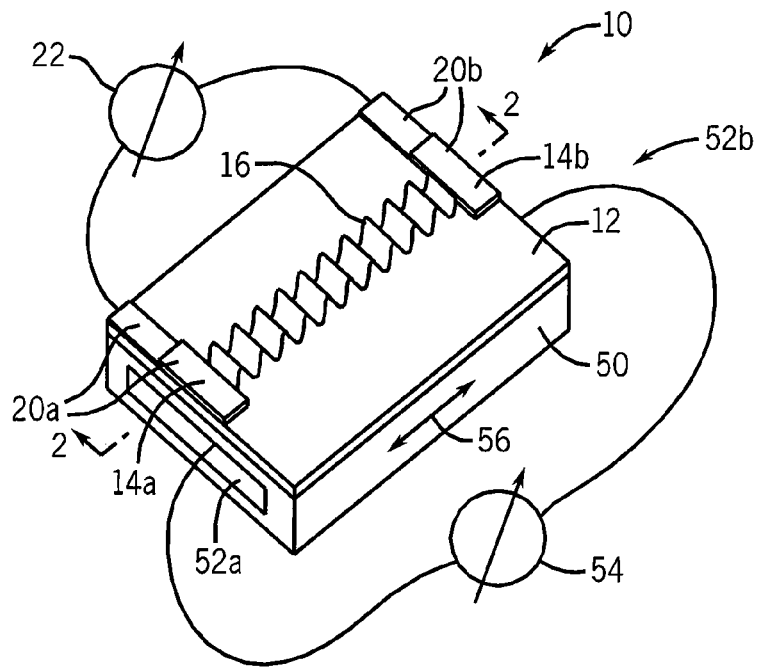
FIG. 1 is a perspective view of a first embodiment of the invention using a self-assembling nanoscale, semiconducting, serpentine ribbon positioned on a piezoelectric actuator for changing the pitch of the serpentine path and hence the frequency of emitted radiation.

Referring now to FIG. 1, a radiating device 10 of the present invention may provide a generally planar substrate 12 having upwardly extending posts 14a and 14b at opposite edges of an upper surface of the substrate 12. A conductive semiconductor ribbon 16 may extend between the posts 14a and 14b, attach at either end to the posts 14a and 14b, and may follow a periodic serpentine path, for example, approximating a sine wave. As will be described, the ribbon 16 may be a single crystal.

Conductive terminals 20a and 20b may be attached to the posts 14a and 14b to communicate electrically with opposite ends of the ribbon 16 to apply a controllable electrical voltage from a voltage source 22 between the posts 14a and 14b and across the ribbon 16. The length of the ribbon 16 may be insulated from the substrate 12 to promote electrical current through the ribbon 16 from post 14a to post 14b.

The ribbon 16, in one embodiment, may be approximately 43 nm thick as measured in the plane of serpentine curvature and will be generally less than 1000 nm thick to constrain electrical current to follow the fine pitch undulations of the ribbon 16 such as produce high accelerations. Generally the invention contemplates a thickness of the ribbon 16 between several microns down to 10 nm. The width of the ribbon 16 is arbitrary and may be much larger than the thickness of the ribbon 16 as dictated by the desired current handling capacity of the device 10.

Figure 2:
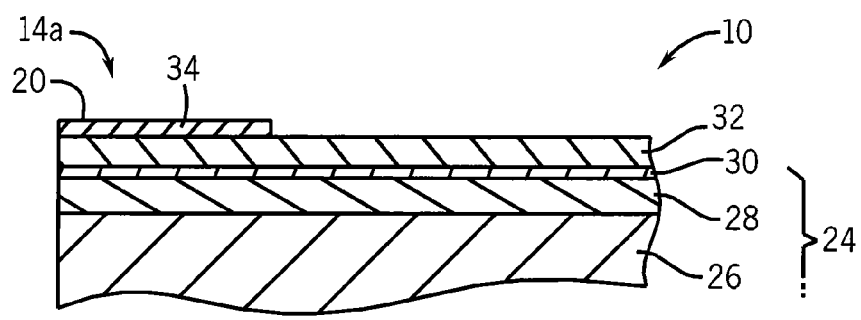
FIG. 2 is a fragmentary cross-section along line 2—2 of FIG. 1 showing the device of FIG. 1 in a first step in its fabrication after the deposition of a compression-stressed semiconductor layer.

Referring now to FIG. 2, the device 10 may be fabricated, in a first embodiment, on a silicon on insulator (SOI) substrate 24 providing a silicon handle 26 separated by a silicon oxide insulator layer 28 of approximately 150 nm thick from a topmost silicon layer 30 thinned to approximately 12 nm.

A silicon-germanium layer 32 may then be deposited on the silicon layer 30, the silicon-germanium layer 32 having a lattice constant that is greater than that of the silicon layer 30 so as to be pre-stressed in compression. The silicon-germanium layer 32 may, for example, be $Si_{0.8}Ge_{0.2}$. This deposition may be performed, for example, using molecular beam epitaxy (MBE), chemical vapor deposition (CVD) or other comparable method.

The silicon-germanium layer 32 (and underlying silicon layer 30) may be patterned using optical or electron beam lithography and may be etched down to the top of the silicon oxide insulator layer 28 to produce a mesa-like strip of silicon-germanium having the approximate dimensions of the ribbon 16 albeit held in planar attachment to the substrate 24.

A metallization layer 34 may be placed on top of the silicon-germanium layer 32 to extend over a portion of the exposed silicon oxide insulator layer 28 in electrical communication with opposing ends of the silicon-germanium layer 32 at the positions of the terminals 20.

Figure 3:
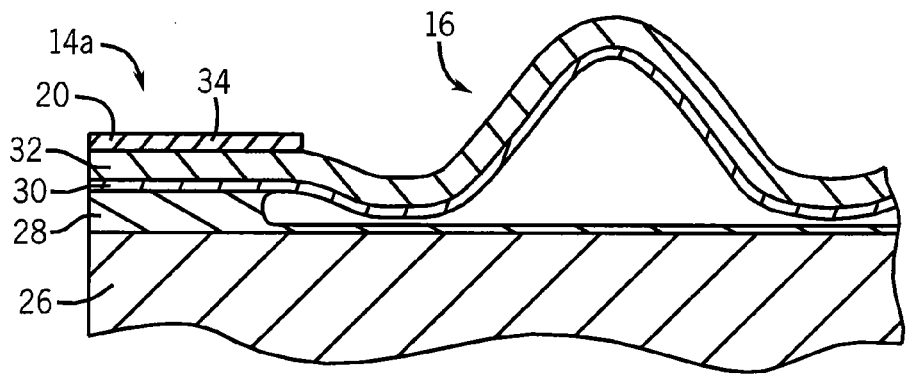
FIG. 3 is a figure similar to that of FIG. 2 showing a second step in the production of the device of FIG. 1 in which a sacrificial layer is removed and the stressed semiconductor layer is released from the supporting substrate to buckle and form a serpentine ribbon in relaxation.

Referring now to FIG. 3, in the second step of fabrication, the silicon oxide insulator layer 28 beneath the silicon layer 30 in the mesa structure is removed at least partially, for example, with hydrogen fluoride etchant in a region outside that of the post 14a (or 14b). A thin oxide layer 28' or other insulator may be maintained on the top surface of the silicon handle 26 or grown there subsequently to insulate the ribbon 16 from the substrate 24.

As released, the compressively strained silicon-germanium layer 32 and the silicon layer 30 relax to match the average lattice constant of the stack of the silicon-germanium layer 32 and silicon layer 30 as multiplied by the thickness of each and the ribbon 16 extends lengthwise, releasing its compressive stress. The ends of the ribbon 16 remain attached to posts 14a and 14 (whose underlying silicon oxide insulator layer 28 is preserved, for example, as a result of the larger area structure of the posts 14a and 14b limiting the effect of undercutting) and as a result, this expansion of the ribbon 16 causes a buckling that forms the serpentine form of the ribbon 16 described above.

Techniques for forming strained structures of this type are described, for example, in U.S. Pat. No. 7,229,901 entitled: "Fabrication of Strained Heterojunction Structures" and published US application 2009/0032842 entitled: "Nanomembrane Structures Having Mixed Crystalline Orientations and Compositions" both naming a co-inventor of the present invention and assigned to the assignee of the present invention and hereby incorporated by reference in their entirety.

Figure 4:
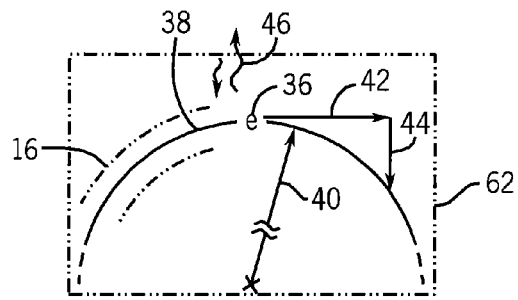
FIG. 4 is a simplified diagram of the emission of radiation caused by the acceleration of electrons around the curved portions of the serpentine path provided by the ribbon.

Referring now to FIG. 4, an electron 36 or other charge carrier traveling on the ribbon 16 will be accelerated along a serpentine path 38 defined by the ribbon 16. It is noted that acceleration may be a change in magnitude of velocity or direction of velocity. This latter acceleration occurs principally at sharply curved regions of the serpentine path having small pitch and corresponding small radius of curvature 40. This curvature produces an acceleration 44 of the velocity 42 shown in simple vector decomposition. The resulting acceleration 44 of the electron 36 will produce emitted radiation 46 according to the relationship of the following equation:

$$\omega = 2\pi\left(\frac{F_0 a}{h}\right) \quad (1)$$

where ω is the frequency of the radiation,
$F_0 = -e_0 E_0$ is the force on the electron applied by the electrical field from the voltage source 22,
a is the periodicity of the ribbon 16, and
h is the Planck constant.

Referring to equation (1), the frequency of the emitted radiation 46 may be controlled in part by the voltage applied across the ribbon 16 such as affects $F_0$. Alternatively, or in addition, the periodicity "a" of the ribbon may be used to control the frequency of the emitted radiation 46.

Figure 5A:
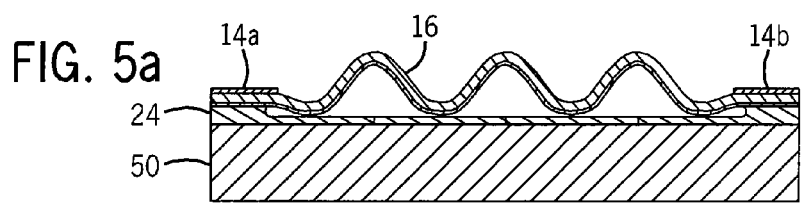
FIGS. 5a and 5b are exaggerated front-elevation views of the device of FIG. 1 showing a changing of the period of the serpentine ribbon curves with a piezoelectric actuator to change the frequency of emitted radiation.
Figure 5B:
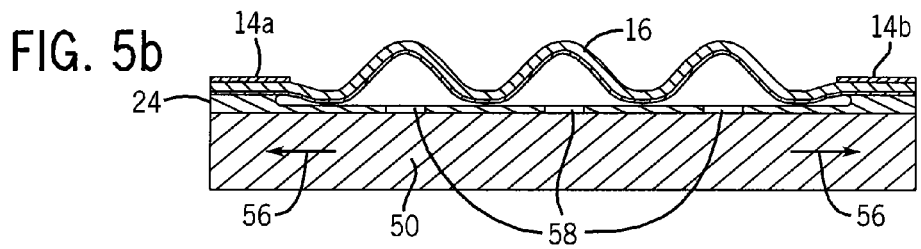

Referring now to FIG. 1 and FIGS. 5a and 5b, the periodicity may be changed by changing the separation between the posts 14a and 14b. This, in turn, may be accomplished in one embodiment by placing the substrate 12 on top of a piezoelectric material 50 having end terminals 52 and 52b connectable to a controllable voltage source 54 so as to provide a longitudinal expansion as indicated by arrow 56 separating posts 14a and 14b. This separation may be promoted by including small slots 58 in the substrate 24. Alternatively, a bending mode can be employed, bending the substrate 24 to be downwardly concave, or other actuator systems including, for example, thermal actuators or the like, may be used.

Figure 6:
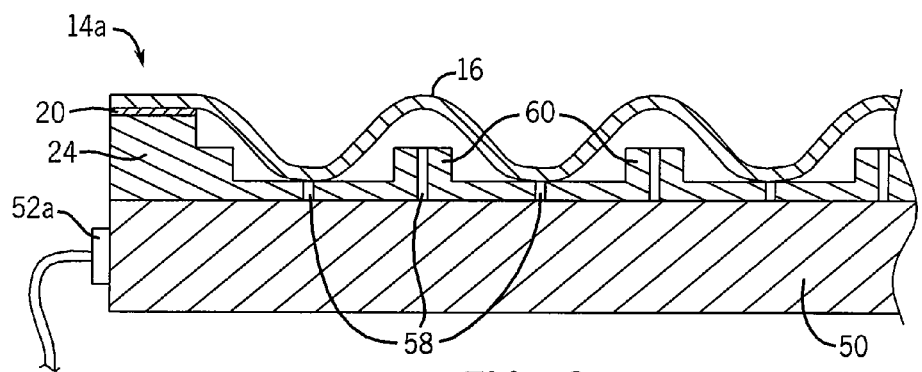
FIG. 6 is an alternative embodiment of the present invention using a graphene layer supported over guiding ridges into a serpentine configuration.

Referring now to FIG. 6, in an alternative embodiment, relativistic electron speeds may be possible by changing the material of the ribbon 16 to material such as graphene. In this case, the serpentine form of the ribbon may be imposed by the construction of periodic upwardly-extending bosses 60 from the substrate 24 and draping the graphene material of the ribbon 16 over the substrate 24 to follow a curvature enforced by the periodic bosses 60. Alternatively, it may be possible to deposit the graphene onto a pre-stressed semiconductor material as described above. Electrons in graphene behave as relativistic particles according to the Dirac equation. Hence, a serpentine graphene conductor enables directly the implementation of the physics of a free electron laser (FEL).

The ends of the graphene material of the ribbon 16 may be adhered to the metallization layers of the terminals 20 by Van der Waals forces or the like. This technique may make possible the production of higher-frequency electromagnetic radiation in the GHz or THz range.

This approach of guiding the ribbon 16 over bosses 60 may also be employed for semiconductor ribbons or other materials.

Referring now to FIG. 4, a resonant cavity structure 62 may be placed about the ribbon 16 so as to provide for a regenerative emission of radiation like that of stimulated emission of a laser. The resonant structure 62 may be radiation reflectors such as conventional free-standing mirrors positioned appropriately to receive the radiation or may be mirror-like layers, for example, Bragg gratings, incorporated into the ribbon 16 by surface treatment, or may be quantum dots or quantum wells or the like fabricated at the appropriate locations.

The charge carriers used in the present invention need not be electrons 36 but may, for example, be "holes" and will constitute generally an electron gas constrained by the ribbon. A significantly thin ribbon 16 may produce quantized levels in the conduction (valence) band. It will be understood that multiple ribbons 16 can be combined in parallel for greater output.

Generally, it is believed that any method that can make periodic curve portions in a ribbon or sheet will serve the purposes of this invention. In addition to the strain method and the laying and bonding of a thin membrane over a periodic array of posts it may be possible to use periodic nanostressors, as described in: "Mechano-electronic Superlattices in Silicon Nanoribbons", Minghuang Huang, Clark S. Ritz, Bozidar Novakovic, Decai Yu, Yu Zhang, Frank Flack, Donald E. Savage, Paul G. Evans, Irena Knezevic, Feng Liu and Max G. Lagally, ACS Nano, 2009, 3 (3), pp 721-727 (Feb. 11, 2009) hereby incorporated by reference. While the inventors do not wish to be bound by a particular theory, the use of a single crystal may be desirable to provide for high carrier mobility and thus rippled single-crystal Si, Ge, GaAs, and graphene may be good choices. It is believed that a combination of high mobility (low scattering) and high curvature are the most significant features of the ribbon 16.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An electronic device comprising:
    a substrate providing a first and second electrical terminal;
    a ribbon of conductive material providing a serpentine electrical path between the first and second electrical terminal, the ribbon providing a thickness along its narrowest dimension of less than 1000 nm and providing periodic curve portions exposed to emit electromagnetic radiation in excess of one MHz caused by an acceleration of charge carriers in the curve portions passing along the ribbon between the first and second terminals.

2. The electronic device of claim 1 wherein the ribbon is a single crystal.

3. The electronic device of claim 1 wherein the ribbon is a semiconductor material having a different lattice constant than the substrate to be pre-strained when fabricated on the substrate to buckle into serpentine configuration providing the periodic curve portions when subsequently released from the substrate but constrained between the terminals.

4. The electronic device of claim 3 wherein the ribbon is a silicon-germanium alloy and the substrate is substantially a silicon substrate.

5. The electronic device of claim 1 further including an actuator attached to the substrate to change a length of the substrate measured between the first and second electrical terminal to change a period of the periodic curve portions and hence the acceleration of electrons.

6. The electronic device of claim 5 wherein the actuator is a piezoelectric material bonded to the substrate activated by electrical voltage to change the length of the substrate.

7. The electronic device of claim 1 wherein the ribbon is graphene and the electromagnetic radiation is in excess of 1 GHz.

8. The electronic device of claim 1 further including an adjustable voltage source connected between the first and second terminal to apply different accelerating forces to the charge carriers in the curve portions passing along the ribbon between the first and second terminals.

9. The electronic device of claim 1 further including a resonant cavity receiving emitted radiation and returning it to the ribbon structure to promote coherent emission of electromagnetic radiation.

10. A method of generating high-frequency electromagnetic waves comprising the steps of
    (a) producing a pre-stressed semiconductor layer on a substrate;
    (b) releasing a center portion of the pre-stressed semiconductor layer to provide a self-assembled serpentine ribbon having periodic curved portions; and
    (c) attaching conductors to opposed ends of the ribbon and applying a voltage thereto to accelerate charge carriers along the ribbon to promote an emission of high-frequency electromagnetic waves.

11. The method of claim 10 wherein the serpentine ribbon is a silicon-germanium, alloy and the substrate is substantially a silicon substrate.

12. The method of claim 10 further including the step of changing a length of the substrate, measured between the opposed ends to change a period of the periodic curve portions and hence an acceleration of the charge carriers.

13. The method of claim 12 wherein the step of changing the length of the substrate employs a piezoelectric material bonded to the substrate and activated by electrical voltage to change length.

14. The method of claim 10 further including the step of adjusting a voltage source connected between the opposed ends to apply different accelerating forces to the charge carriers in the curved portions passing along the ribbon between the opposed ends.

15. The method of claim 10 further including the step of directing a portion of emitted electromagnetic radiation back toward the ribbon structure to promote coherent emission of electromagnetic radiation.

* * * * *